United States Patent
Rexhepaj et al.

(10) Patent No.: US 12,315,147 B2
(45) Date of Patent: May 27, 2025

(54) AUTOMATED PATTERN RECOGNITION AND SCORING METHOD OF FIBROSIS FROM NON INVASIVE RADIOLOGY IMAGING

(71) Applicant: MEDIAN TECHNOLOGIES, Valbonne (FR)

(72) Inventors: Elton Rexhepaj, Antibes (FR); Corinne Ramos, Montreuil (FR); Nozha Boujemaa, Chaville (FR); Jean-Christophe Brisset, Valbonne-Sophia Antipolis (FR); Pierre Baudot, Marseilles (FR); Sébastien Poullot, Pantin (FR); Benjamin Renoust, Antibes (FR); Benoit Huet, Roquefort-les-Pins (FR)

(73) Assignee: MEDIAN TECHNOLOGIES, Valbonne (FR)

( * ) Notice: Subject to any disclaimer, the term of this patent is extended or adjusted under 35 U.S.C. 154(b) by 435 days.

(21) Appl. No.: 17/772,881

(22) PCT Filed: Nov. 5, 2020

(86) PCT No.: PCT/EP2020/081207
§ 371 (c)(1),
(2) Date: Apr. 28, 2022

(87) PCT Pub. No.: WO2021/089741
PCT Pub. Date: May 14, 2021

(65) Prior Publication Data
US 2022/0414870 A1    Dec. 29, 2022

Related U.S. Application Data

(60) Provisional application No. 62/931,286, filed on Nov. 6, 2019.

(51) Int. Cl.
G06T 7/00 (2017.01)
G06T 7/11 (2017.01)

(52) U.S. Cl.
CPC .............. G06T 7/0012 (2013.01); G06T 7/11 (2017.01); G06T 2207/10081 (2013.01); G06T 2207/20081 (2013.01); G06T 2207/30056 (2013.01)

(58) Field of Classification Search
CPC .............. G06T 7/0012; G06T 7/11; G06T 2207/10081; G06T 2207/20081; G06T 2207/30056; G06T 7/30; G06T 7/38
See application file for complete search history.

(56) References Cited

U.S. PATENT DOCUMENTS

| | | | |
|---|---|---|---|
| 2014/0205541 A1* | 7/2014 | James | G06T 7/0014 424/9.3 |
| 2020/0349674 A1* | 11/2020 | Ramanujam | G06N 5/025 |

FOREIGN PATENT DOCUMENTS

WO    WO-2014011925 A2 *    1/2014    ............. A61B 5/055

OTHER PUBLICATIONS

Ting-Yu Su, Wei-Tse Yang, Tsu-Chi Cheng, Yi Fei He, Ching-Juei Yang, Yu-Hua Fang, (2019) "Computer-aided liver cirrhosis diagnosis via automatic liver segmentation and machine learning algorithm," Proc. SPIE 11050, International Forum on Medical Imaging in Asia 2019, 1105011 (Mar. 27, 2019); (Year: 2019).*

(Continued)

*Primary Examiner* — Utpal D Shah
*Assistant Examiner* — Jack Peter Kraynak
(74) *Attorney, Agent, or Firm* — HAUPTMAN HAM, LLP

(57) ABSTRACT

A method for performing classification of the severity of at least one liver disease from non-invasive radiographic images is disclosed. The method includes: providing radio- (Continued)

graphic images of slices of the abdomen of a patient; pre-processing the radiographic images by: segmenting liver and spleen, thus achieving a spleen binary mask and a liver binary mask per slice, and normalizing the images with each other, thus achieving normalized radiographic images per slice; for each slice, from the liver binary mask and the normalized radiographic images, extracting a liver parameter; from at least one spleen binary mask, extracting a spleen parameter; and classifying, in function of both parameters and by help of a trained Machine Learning model, the severity of liver disease between one among a group of liver disease at early stage and a group of liver disease at advanced stage.

20 Claims, 2 Drawing Sheets

(56) References Cited

OTHER PUBLICATIONS

Rexhepaj et al, 2084: "Automated Quantification of Computed Tomography Hepatosplenic [ . . . ]," Hepatology; 70th Annual Meeting of the American-Association-for-the-Study-of-Liver-Diseases (AASLD) / Liver Meeting, Wiley Interscience, US; vol. 70, No. Suppl. 1, 1 Oct. 1, 2019 (Oct. 1, 2019), p. 1236A-123 (Year: 2019).*

Chen, Y. W., Luo, J., Dong, C., Han, X., Tateyama, T., Furukawa, A., & Kanasaki, S. (2013). Computer-aided diagnosis and quantification of cirrhotic livers based on morphological analysis and machine learning. Computational and mathematical methods in medicine, 2013, 264809. https://doi.org/10.1155/2 (Year: 2013).*

Yu, Y., Wang, J., Ng, C. W., Ma, Y., Mo, S., Fong, E. L. S., Xing, J., Song, Z., Xie, Y., Si, K., Wee, A., Welsch, R. E., So, P. T. C., & Yu, H. (2018). Deep learning enables automated scoring of liver fibrosis stages. Scientific reports, 8(1), 16016. (Year: 2018).*

Rexhepaj et al., "Automatic high-risk fibrosis score prediction using computed tomography imaging", Journal of Hepatology, Nov. 8, 2019, p. S777.

Rexhepaj et al., "2084: Automated Quantification of Computed Tomography Hepatosplenic Radiomics Correlates With Liver Fibrosis", Hepatology, 70th Annual Meeting of the American-Association-for-the-Study-of-Live-R-Diseases (AASLD) / Liver Meeting, Wiley Interscience, Boston, MA, USA, vol. 70, No. Suppl. 1, Oct. 1, 2019, pp. 1236A-1237A.

Ting-Yu et al., "Computer-aided liver cirrhosis diagnosis via automatic liver segmentation and machine learning algorithm", Proceedings of SPIE, vol. 11050, Mar. 27, 2019, pp. 1105011-1-1105011-6.

Erickson et al., "Machine Learning for Medical Imaging", Radiographics, vol. 37, No. 2, Mar. 1, 2017, pp. 505-515.

Bonekamp et al., "Can imaging modalities diagnose and stage hepatic fibrosis and cirrhosis accurately?", Journal of Hepatology, vol. 50, No. 1, Jan. 1, 2009, pp. 17-35.

Yin et al., "Prediction of nonalcoholic fatty liver disease (NAFLD) activity score (NAS) with multiparametric hepatic magnetic resonance imaging and elastography", European Radiology, vol. 29, No. 11, Mar. 18, 2019, pp. 5823-5831.

Rohe et al., Feasibility of Using Deep Learning Techniques to Assess Hepatic Fibrosis Directly from Magnetic Resonance Elastography Source Images, AASLD, The Liver Meeting, Nov. 7, 2018.

International Search Report issued in corresponding International Application No. PCT/EP2020/081207, dated Feb. 3, 2021, pp. 1-4, European Patent Office, Rijswijk, Netherlands.

Written Opinion issued in corresponding International Application No. PCT/EP2020/081207, dated Feb. 3, 2021, pp. 1-5, European Patent Office, Rijswijk, Netherlands.

* cited by examiner

AUTOMATED PATTERN RECOGNITION AND SCORING METHOD OF FIBROSIS FROM NON INVASIVE RADIOLOGY IMAGING

CROSS-REFERENCE TO RELATED APPLICATIONS

The present application is a U.S. National Phase of International Application Number PCT/EP2020/081207, filed Nov. 5, 2020, which claims priority to U.S. Provisional Application No. 62/931,286, filed Nov. 6, 2019.

TECHNICAL FIELD

The disclosure relates to a method for performing classification of severity of at least one liver disease from non-invasive radiographic images.

BACKGROUND

The prevalence of Non Alcoholic Fatty Liver Disease (NAFLD) is rapidly growing and represents a major public health issue. A recent population based screening study in Asia found that approximately 41% of men and 18% of women had NAFLD. As the number of patients with obesity and diabetes mellitus rises, the incidence of NAFLD is expected to further increase. Knowing that Non Alcoholic Steatohepatitis (NASH), as the more serious subtype of NAFLD, drives progressive fibrosis accumulation ultimately leading to cirrhosis and hepatocellular carcinoma (HCC), and with HCC being the fifth most frequent cancer and the second cause of cancer deaths worldwide, it is of main interest to detect NASH and more particularly HCC at early stage when patients can be cured in up to 90% of the cases under the best circumstances.

Several methods exist that aim at performing classification of liver disease levels from non-invasive radiographic images.

One among such existing methods is developed by Perspectum Diagnostics Ltd, known as LiverMultiScan® and consists in: positioning a patient in association with a medical imaging device, preferably a magnetic resonance (MR) scanner; using the medical imaging device to measure the subject's liver for extracellular fluid; measuring the liver for iron overload; determining whether iron overload may be indicated or present from the measurement for iron content, and if indicated correcting the measurement for extra cellular fluid; measuring the liver for hepatic lipid content (HLC); and determining from said measurements the presence or absence of liver disease (Steatosis, Inflammation and Fibrosis).

Disadvantageously, the needed magnetic resonance imaging (MRI) has to fulfill a constraining proprietary MRI acquisition protocol. For instance, this protocol comprises a long procedure that requires about 15 min to be implemented and needs to be done in addition to scans done routinely for a typical patient suffering from liver-related pathologies. Thus, it requires additional resources in radiology departments, such as subsequent time with respect to a usual MRI scan (not necessarily avoided), initial set up and specific staff training. Moreover, despite said constraining protocol, the required MRI can result in unreliable readings, notably if there is significant fat or fluid between the probe and the liver; this is usually the case for patients with obesity or ascites. Furthermore, this method has very variable performances across the spectrum of different parameters defining liver diseases (steatosis, inflammation and fibrosis). Indeed, based on published results about said method, it is less accurate for fibrosis than inflammation. This may result from its calibration on morphological liver information and at least partially explain its low specificity. Another limitation of the method at least partially induced by the aforementioned ones is its non-compliance to be applied retrospectively to historical imaging data for all liver disease parameters. Note also that, when magnetic resonance elastography (MRE) is implied by this method, it is only dedicated to assess both liver texture and elasticity within a given expert center.

FibroScan® by ECHOSENS provides also a non-invasive diagnosis of liver disease. The FibroScan® is an autonomous and independent device operating by ultrasound, but is imprecise in the quantification of fibrosis and provides results that are not reproducible. It is a simple diagnostic tool that will refer the patient to a radiology center for more information to inform the diagnosis.

More particularly, FibroScan® is a non-invasive technology quantifying fibrosis and steatosis by 'Vibration Controlled Transient Elastography', aka VCTE. VCTE is a proprietary ultrasound elastography technology developed by ECHOSENS. It allows for measurement of tissue elasticity with quantitative, reproducible, real time results expressed in kPa (kiloPascal) and is a standard recognized by hepatologists and validated by a large number of publications.

Although Transient Elastography (aka TE) has been proposed as a non-invasive tool to measure liver fibrosis, TE actually measures the shear wave speed through the liver which reflects liver stiffness and not actual amount of fibrosis in the liver. Hence conditions which increase the stiffness of the liver independent of fibrosis will result in an increased LSM (for "liver stiffness measurement") and will result in a falsely high estimate of liver fibrosis.

Early studies in TE using the standard M probe encountered a high rate of TE failure between 5%-22% for obese patients with high BMI (>30 kg/m$^2$) and increased waist circumference. Furthermore one of the difficulties in using TE in routine clinical practice is the variability of optimal cut-off levels for the diagnosis of fibrosis and cirrhosis in different etiologies of liver disease.

Initial studies in TE defined reliable results as those with at least 10 validated measurements, a success rate of at least 60% and an IQR/M ratio less than 0.3 (where IQR stands for interquartile range and M stands for median).

Although TE has been described to be an operator-independent procedure with a high inter-observer agreement of up to 98%, it may be recognized as suffering from low reproducibility due to high variability in acquisition (coming from tools, probes, patients and operators).

SUMMARY

It is a general object of the invention to provide a method for performing automated classification of the severity of at least one liver disease from non-invasive radiographic images, while maintaining an equivalent, or delivering even better, liver disease assessment quality, notably by obtaining reliable parameters on the radiographed liver.

Another object of the invention is to provide a method for performing classification of the severity of at least one liver disease from non-invasive radiographic images which allows overcoming at least one drawback of the above cited prior art, and notably which significantly simplifies the radiological acquisition protocol requirements with respect to the above cited prior art.

More particularly, it is an object of the invention to provide a method for performing classification of the severity of at least one liver disease from non-invasive radiographic images which:

facilitates radiological work and makes it operable by a wider variety of practitioners, and/or is able to analyse a wider range of radiographic images, including historical radiographic images, and/or allows the use of radiographic images taken at different stages of the disease notably in order to be able to observe its evolution.

According to the invention, it is provided a method for performing classification of the severity of at least one liver disease from non-invasive radiographic images acquired during a scan, the method comprising:

providing radiographic images of slices of at least the abdomen of a patient, with at least two radiographic images being provided for each slice; and pre-processing said radiographic images at least by:
for each slice, segmenting liver and spleen from at least one of said at least two radiographic images, thus achieving a spleen binary mask and a liver binary mask per slice, and
normalizing said radiographic images with each other, thus achieving at least two normalized radiographic images per slice;

the method further comprising:
for each slice, at least from the liver binary mask and said at least two normalized radiographic images, extracting at least one parameter characterizing the liver;
from at least one spleen binary mask, extracting at least one parameter characterizing the spleen; and
inputting said at least one parameter characterizing the liver and said at least one parameter characterizing the spleen into a trained Machine Learning (ML) model, with this latter being designed to classify the severity of at least one liver disease between one among a group of the at least one liver disease at early stage and a group of the at least one liver disease at advanced stage in function of both of said at least one parameter characterizing the liver and said at least one parameter characterizing the spleen.

The method as introduced above may also be considered as comprised of a step of classifying, in function of both of said at least one parameter characterizing the liver and said at least one parameter characterizing the spleen and by help of a trained Machine Learning model, the severity of at least one liver disease between one among a group of the at least one liver disease at early stage and a group of the at least one liver disease at advanced stage, for instance in place of said inputting step.

It is thus provided a new method for performing non-invasive automatic classification of the severity of liver disease from radiographic images to identify low risk (F0, F1 and F2) and high risk (F3 and F4) liver disease levels of a liver disease.

Quantification of the liver disease level is obtained using morphological parameters of the spleen as reference.

According to a preferred, but optional embodiment, the method as introduced above further comprises: inputting patient clinical information into said trained ML model, with this latter being designed to classify the severity of the at least one liver disease between one among a group of the at least one liver disease at early stage and a group of the at least one liver disease at advanced stage not only in function of both of said at least one parameter characterizing the liver and said at least one parameter characterizing the spleen, but also in function of the patient clinical information.

The method according to this preferred, but optional embodiment is thus made multimodal and then allows achieving a higher performance level.

According to another aspect of the invention, it is provided a computer program product comprising instructions which, when implemented by at least one digital processing device, performs at least the steps of the method as introduced above. According to another aspect of the invention, it is provided a non-transitory computer readable medium storing instructions which, when implemented by at least one digital processing device, performs at least the steps of the method as introduced above.

Other aspects, objects, features and advantages of the invention(s) disclosed herein, and their various embodiments, may become apparent in light of the descriptions of some exemplary embodiments that follow.

BRIEF DESCRIPTION OF THE DRAWINGS

Reference will be made in details to embodiments of the disclosure, non-limiting examples of which may be illustrated in the accompanying drawing figures.

Any text (legends, notes, reference numerals and the like) appearing on the drawings are incorporated by reference herein.

DETAILED DESCRIPTION

Figure 1:
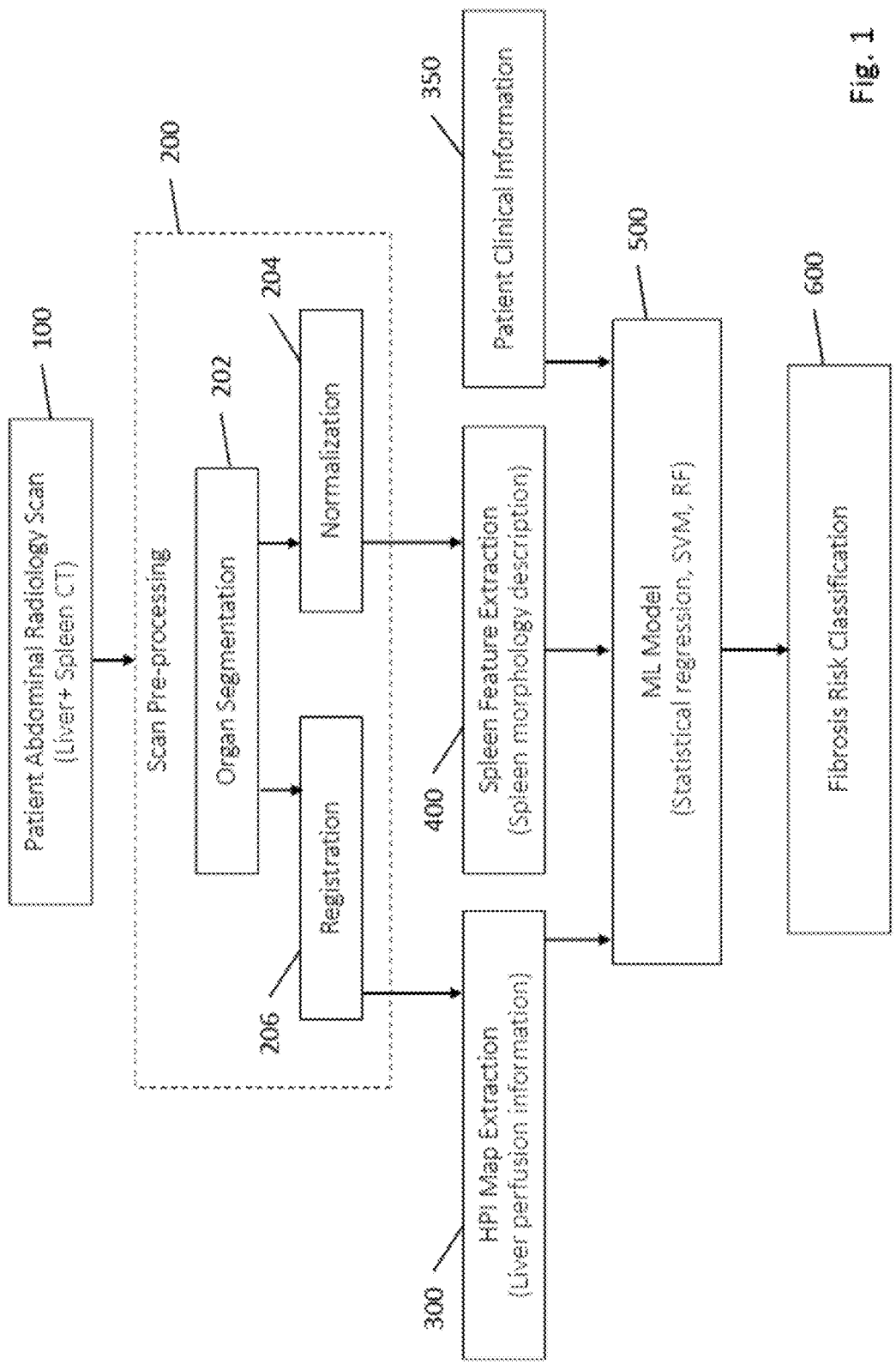
FIG. 1 is a flowchart of a first embodiment of the method according to the present invention.

According to the present invention, the term "scan" relates to a procedure that provides radiographic images issued from at least one medical imaging technique. Two medical imaging techniques are particularly foreseen to be used in the framework of the present invention:

1) Computed Tomography (CT) scanning of a patient with and without a contrast agent injected prior to the scanning, and 2) Magnetic resonance imaging (MRI), with or without a contrast agent injected prior to the scanning, together with Magnetic Resonance Elastography (MRE).

A non-contrasted radiographic image is generated without injecting a contrast agent to the patient prior to the scanning. A contrasted radiographic image is generated with injecting a contrast agent to the patient prior to the scanning. The contrast agent may be designed to highlight specific areas to make at least one or one chosen among blood vessels, organs and tissues more visible during a scanning, and potentially at different determined times after the injection. Thus, a contrasted radiographic image may for instance aim at highlighting the arterial phase during a first scanning step, and the portal venous phase during a second scanning step, by using the same contrast agent at different determined times after the injection or by using different contrast agents. Another phase might be observed during a scan according to the present invention that is called delayed phase because the corresponding scanning step is delayed, with a determined period of time, with respect to at least one among the first and second scanning steps as introduced above. Such a scanning of the delayed phase can allow highlighting other specific areas to make other features more prominent with respect to arterial and/or portal venous phases. Delayed phase acquisition during a further scanning step of a scan according to the present invention can follow either acquisition of the arterial phase and/or acquisition of the portal venous phase.

A scan according to the present invention may comprise a series of scanning steps made by implementing at least once one of the two above mentioned medical imaging techniques in order to provide radiographic images of interest.

According to the present invention, the term "fibrosis" or equivalently "liver fibrosis" refers to the presence of fibrous connective tissue of the liver. This presence may generally be observed at microscopic examination of a stained (H&E, trichrome or picrosirius red staining) slice of a liver biopsy or by a non-invasive medical imaging examination of the patient and differential analysis of the inherent patterns within a scan or between two consecutive scans of the same during the same visit.

The term "patient clinical information" refers to data about a patient which have been acquired by clinical examination. It may comprise at least one among: age, sex, height, weight, BMI, ethnic origin, medical conditions and risk factors of each patient.

According to the invention, the term "registration" or "registering" refers to a scan pre-processing step that aims at aligning the same object across two different acquired phases using a transformation. More specifically, it can be defined as an operation consisting in ensuring the correct relative localization of a region of interest (ROI) across radiographic images of different phases.

A typical example of "registration" considers two medical images from the same patient, but taken at different dates or acquired through different scanning steps. It is very likely that the patient assumes a different position during each scanning step. By taking both images, a registration procedure allows finding a spatial transformation owing to which a corresponding pixel from one image into the other is found.

Another typical example of "registration" considers a geometrical model of an organ, for instance a bone. This model can be used to find the corresponding structure in a medical image. In this case, a spatial transformation is needed in order to find the correct location of the structure in the image.

According to the invention, the term "normalization" or "normalizing" refers to a scan pre-processing step that produces data units, potentially in the form of images, fulfilling at least one, preferably several, more preferably each, of the following criteria:
  have a common interpretation across locations within the same scanned tissue type,
  are replicable,
  preserve the rank of intensities,
  have similar distributions for the same scanned tissues of interest within and across patients,
  are not influenced by biological abnormality or population heterogeneity,
  are minimally sensitive to noise and artifacts, and
  do not result in loss of information associated with pathology or other phenomena.

According to the invention, the term "segmentation" refers to a process of partitioning at least one radiographic image into multiple anatomical regions (sets of voxels, also known as image objects) such as liver, spleen, bones, fat, body cavity. The goal of segmentation is to determine a region of interest for exploratory analysis and to simplify and/or change the representation of a radiographic image into something that is more meaningful and easier to analyze.

According to the present invention, the term "machine learning" refers to computer algorithm(s) able to automatically make classification(s) without explicit programming. The computer algorithm builds said mathematical model from training data.

According to the invention, the term "survival analysis" is defined as a set of methods (Kaplan-Meir differential survival analysis modelling and testing, Cox-regression hazard ratio modelling and testing) for analyzing data where the outcome variable is the time until the occurrence or non-occurrence of an event of interest. In the framework of the present invention, we are mainly interested with the recurrence of hepatocellular carcinoma (HCC).

Generalization properties of existing classification pipelines, as well as the here proposed classification pipeline, for liver disease were assessed using independent cohorts for development, testing and validation. The final goal was to translate micro/macro assessments into clinically relevant information and to validate the here proposed classification pipeline against the reference pathologist annotations and clinical outcome. Some results are shown on FIG. 3 detailed at the end of the specification.

Figure 2:
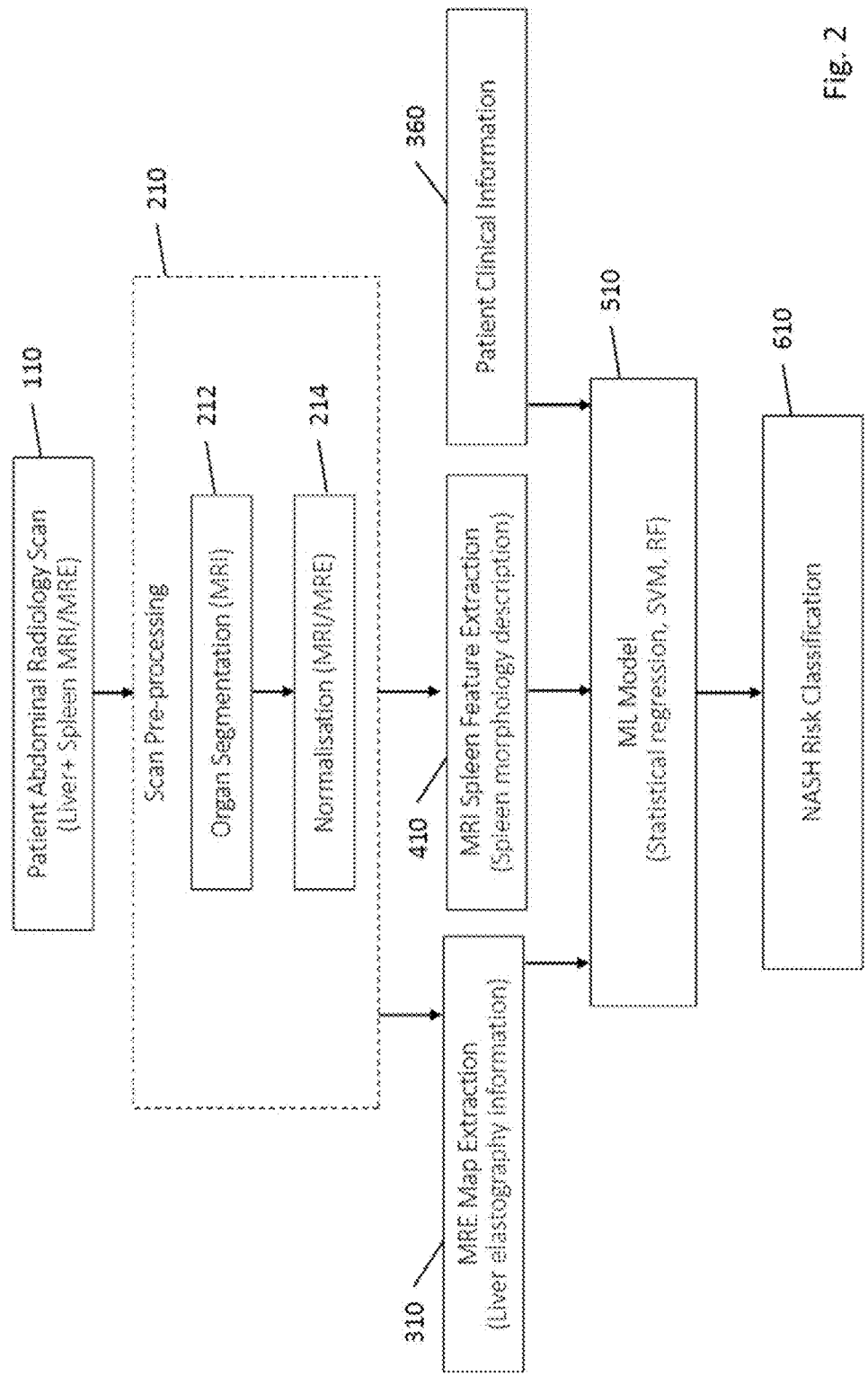
FIG. 2 is a flowchart of a second embodiment of the method according to the present invention.

The invention detailed here after with references to FIG. 1 and FIG. 2 provides a method for robust automatic classification of at least one liver disease from radiographic images (computed tomography (CT) modality or magnetic resonance imaging (MRI)/magnetic resonance elastography (MRE) modality).

The method according to the invention is based on radiomics, morphometry analysis and machine learning to automate classification of at least one liver disease.

More particularly, according to the method of the present invention, level of the at least one liver disease is assessed by using machine learning in order to classify pathologically relevant liver unhealthy areas that may be confirmed by following morphometry quantification of CPA (Collagen Proportion Area) and fibrous septa.

Liver disease classification allows:
  the clinical assessment of liver disease, which is the indication of the risk of liver disease evolution, for instance from fibrosis to cirrhosis, and
  perform the risk assessment of a patient suffering from NAFLD, or more specifically from NASH,
  in a particularly advantageous manner when based on the robust scoring of liver disease according to the hereby proposed automated reading and scoring method.

Like for all machine learning applications, the properties of machine learning model which have been already used in implementing the method according to the present invention may advantageously be critically reviewed to produce, if needed, even more objective, accurate and reproducible results.

Generally, the detection of liver disease in a patient consists in attributing to said patient a scoring value F. For instance, with fibrosis as liver disease, F=0 in case no fibrosis is detected (F0) and F>0 in case fibrosis is/are detected. The classification of liver disease in a patient consists in grading of the scoring values F among different groups (F1 to F4) For instance, with fibrosis as liver disease, F=1 for minimal fibrosis (F1), F=2 for moderate fibrosis (F2), F=3 for significant fibrosis (F3) and F=4 for severe fibrosis (F4).

The invention relates to a method for the classification of the severity of liver disease of a patient as being either part of 'early stage' group (for fibrosis: F0, F1 and F2) or part of 'advanced stage' group (for fibrosis: F3, F4). Such a classification advantageously allows responding to clinical need of non-invasive risk patient stratification.

FIG. 1 shows a flowchart of a first specific embodiment of the method according to the present invention.

This embodiment implements the aforementioned CT modality. It is particularly adapted to classification of the severity of liver fibrosis. The following detailed description of the first specific embodiment of the method according to the present invention is thus concerned by fibrosis as the liver disease, the severity of which has to be classified, but it should be construed as a non-limiting example; that is to say that the first specific embodiment described hereafter can be used for classification of at least one another liver disease as well.

With reference to FIG. 1, the method according to said first specific embodiment comprises:
  providing 100 a CT image of the non-contrasted phase, a CT image of the arterial phase and a CT image of the portal venous phase per slice of the abdomen of a patient, with, if needed, the provided CT images having been controlled for retaining CT images having a quality value superior to a determined threshold;
  pre-processing 200 said CT images by:
    for each slice, segmenting 202 liver and spleen from said CT images, thus achieving three spleen binary masks and three liver binary masks per slice,
    normalizing 204 said CT images with each other, thus achieving normalized CT images per slice, and
    for the non-contrasted phase, the arterial phase and the portal venous phase, registering 206 the corresponding CT images by using the spleen binary masks and the liver binary masks, thus achieving aligned CT images across said phases; then
  for each slice, extracting 300 a map of HPI from the corresponding CT images, the liver binary masks of the slice and the corresponding aligned CT images, thus achieving a map of HPI per slice as parameters characterizing the liver;
  from the spleen binary masks, extracting 400 spleen volume, spleen elongation ratio, spleen minimal size and spleen maximum size as parameters characterizing the spleen; then
  inputting 500 the parameters characterizing the liver and the parameters characterizing the spleen into a trained ML model designed to classify the fibrosis severity level between one among an early stage fibrosis group and an advanced stage fibrosis group in function of both inputs, and
  displaying 600 the fibrosis severity level as classified.

Patient clinical information can also be inputted 350 into said trained ML model. In this case, this latter is preferably designed to classify the severity of fibrosis not only in function of both of said at least one parameter characterizing the liver and said at least one parameter characterizing the spleen, but also in function of the patient clinical information. An enhanced performance level is hence achieved which may yield to results as shown below into Table 1.

A CT image of one delayed phase may further be used in order to enhance quality of the classification by allowing other features than the ones made prominent on arterial and/or portal venous phases.

According to another preferred technical feature of the first embodiment, the spleen mask is used for the arterial and non-contrasted phases, whether the venous network is selected as the most optimal anatomical structure for the portal and delayed phases.

Each HPI can be computed as the proportion of the luminance attenuation of the arterial phase to the luminance attenuation of the portal venous and arterial phases, and more particularly by solving the following equation:

$$HPI=[(HUA)/(HUP+HUA)]\times 100,$$

where HU is the luminance attenuation, A is the arterial phase and P is the portal venous phase.

HPI is relevant here since an HCC lesion that has a predominantly arterial blood supply is expected to show a high HPI, in contrast to normal liver tissue with around 20% arterial blood supply and 80% portal venous blood supply.

The here proposed method uses perfusion patterns taking the form of HPI maps and thus allows benefiting of a sensitivity superior to 80%, or even superior to 88%, for HCC detection.

Thus, FIG. 1 illustrates an overview of a first embodiment of the here proposed computational pipeline.

Features characterizing the abdomen, and obviously the liver, of a patient are firstly extracted. More particularly, to have a more accurate and comprehensive view of hepatic fibrosis, not only the liver but also the spleen, as an adjacent organ of the abdomen with respect to the liver, are analyzed. A critical step for the analysis is the spatial registration of consecutive slices or scanning steps (i.e. non-contrasted, arterial, portal venous, and eventually delayed). As part of the pipeline, a registration method is proposed that allows handling rigid and non-rigid deformations. Hence, the registration of any two radiographic images from the same patient within the same visit is available. More particularly, the arterial phase may be selected as a reference phase and all other phases may be registered against this reference phase. To optimize the correction of deformation between a fixed phase (reference without deformations) and a moving phase (with deformation), the registration may be implemented into two steps: A rigid step which is designed to iteratively search for the optimal affine transformations (translation, rotation, scaling) allows correcting for most rigid deformations and hence provides a near-optimal global correction of deformations; then a second step of non-rigid registration provide a fine grain (for instance 5×5×25 mm) deformation grid, where each Volume Of Interest (VOI) is subject to an independent transformation to better correlate the reference phase with each of the moving phases. Post registration, any voxel of the CT images in the same physical space coordinates can be compared among different slices or different scanning steps. In parallel to registration, a normalization algorithm, that estimates the bias from selected anatomical structures as variability in the radiographic image values due to technical, instrumental and scanning protocol, is implemented to be able to compare two patients with each other. The masks obtained by segmentation for the CT images are used to estimate normalization parameters.

Then, for each patient, features covering perfusion patterns of the liver and parameters covering the morphology and volume of the spleen are extracted, to be used as input of the trained ML model or for training the ML model with regard to classification across either early stage fibrosis group (F0, F1 and F2), or advanced stage fibrosis group (F3, F4). Those parameters as expressed by their value(s) may further be scaled to the same mean and standard deviation using z-score standardization approach. The mean and standard deviations may then be used to scale all new data to test the ML model prospectively. The ML model may be constructed by help of a training data set and validated by help of an independent data set.

Furthermore, given the well-known link between fibrosis and risk of recurrence, the correlation of fibrosis risk scores as predicted by help of the here proposed pipeline can be tested with the event of recurrence using survival analysis methods.

FIG. 2 shows a flowchart of a second specific embodiment of the method according to the present invention.

This embodiment implements the aforementioned MRI/MRE modality. It is particularly adapted to classification of the severity of NASH. The following detailed description of the second specific embodiment of the method according to the present invention is thus concerned by NASH as the liver disease, the severity of which has to be classified, but it should be construed as a non-limiting example; that is to say that the second specific embodiment described hereafter can be used for classification of at least one another liver disease as well.

With reference to FIG. 2, the method according to said second specific embodiment comprises:
providing 110 for each slice of the abdomen of a patient:
a radiographic image, called MRI image, acquired by magnetic resonance imaging (MRI) with or without contrast agent and
a radiographic image, called MRE image, acquired by magnetic resonance elastography (MRE),
with, if needed, the provided MRI and MRE images having been controlled for retaining the ones having a quality value superior to a determined threshold; and
pre-processing 210 said MRI and MRE images at least by:
for each slice, by using the MRI image, segmenting 212 liver and spleen, thus achieving a spleen binary mask and a liver binary mask per slice, and
normalizing 214 said MRI and MRE images with each other, thus achieving at least two normalized MRI and MRE images per slice; then
for each slice, extracting 310, from the normalized MRE image by using the corresponding liver binary mask, elastography information as parameter characterizing the liver;
from the spleen binary masks, extracting 410 spleen area, spleen shape, spleen form factor, spleen compactness, spleen eccentricity and spleen solidity, as parameters characterizing the spleen; and
inputting 510 the parameters characterizing the liver and the parameters characterizing the spleen into a trained ML model designed to classify the NASH severity level between one among an early stage NASH group and an advanced stage NASH group in function of both inputs, and
displaying 610 the NASH severity level as classified.

Patient clinical information can also be inputted 360 into said trained ML model. In this case, this latter is preferably designed to classify the severity of NASH not only in function of both of said at least one parameter characterizing the liver and said at least one parameter characterizing the spleen, but also in function of the patient clinical information. An enhanced performance level is hence achieved which may yield to results as shown below into Table 1.

Note that the step of controlling quality, the substeps of segmenting 212 and normalizing 214 and the step of displaying 610 may be implemented with the same specificities as those implemented with reference to the first specific embodiment of the invention and described here below.

In order to extract 310 elastography information or equivalently in order to compute a value characterizing said elastography information, a deep learning convolutional network may be applied which allow enhancing NASH relevant features in 2D MRE images. On the Region Of Interest (ROI) defined by the liver segmentation outline, a mean value relating to elastography information may thus be computed.

For both modalities, the following technical features are implementable. They allow further specifying the already introduced technical features with optional embodiments.

Firstly, said trained ML model may be designed to classify the liver disease level by implementing class prediction method.

Secondly, in alternative or in complement of the optional technical feature above, the ML model may be based on one among regression analysis software, Support-Vector Machine (SVM) and Random Forest (RF) classifier.

Said ML model may need to be specifically designed for either CT or MRI/MRE modalities. For instance, its calibration preferably takes into account for the specificity of the previous steps of the method. It may involve cutting edge methodology and consists in finding the most accurate, reproducible and scalable parameters for each modality (i.e. CT and MRI/MRE). Defining the ad hoc design of the ML model(s) (potentially one per modality) may be considered as feasible by the skilled person by application of his/her common general knowledge and by routine experimentations.

Thirdly, said radiographic images may be advantageously provided as DICOM (Digital Imaging and Communications in Medicine) image files.

Fourthly, the normalizing substep of said pre-processing step may comprise, or may consist in, an automatic pixel luminance range adaptation of said radiographic images with each other.

Fifthly, the segmenting substep of said pre-processing step may comprise, or may consist in, an automatic contouring of spleen and liver for each slice. An algorithm allowing segmentation liver, spleen and potentially other organs from a CT image or MRI image is thus implemented.

Table 1 below shows results of the here proposed method for comparison to published results of LiverMultiscan® method, for approximately equal total number of tests. With the here proposed method, both modality have been considered: results into column 3 of Table 1 have been acquired using CT images as input of an embodiment of the here proposed method as illustrated on FIG. 1 and results into column 4 of Table 1 have been acquired using CT images as input of an embodiment of the here proposed method as illustrated on FIG. 2. Great differences of values of Sensitivity, Specificity, Positive Predictive Value and Negative Predictive Value have been observed, which each shows enhancement achieved owing to the here proposed method in comparison to LiverMultiscan® method, for both of either CT modality or MRI/MRE modality. The receiver operator curve (ROC) as achieved owing to corresponding embodiments of the here proposed method has also been computed. The thus achieved AUC (Area Under Curve) values show the best overall performance of the classification model according to the here proposed method.

TABLE 1

Benchmark between published results of LiverMultiscan ® method vs results of the here proposed method with CT modality and with MRI/MRE modality

| Data Type | LiverMultiScan ® MRI | Here proposed method CT | Here proposed method MRI/MRE |
|---|---|---|---|
| AUC | 0.80 | 0.88 | 0.89 |
| Sensitivity | 0.71 | 0.88 | 0.93 |
| Specificity | 0.67 | 0.87 | 0.89 |
| PPV | 0.28 | 0.95 | 0.95 |
| NPV | 0.93 | 0.72 | 0.84 |
| N Training | 102 | 56 | 91 |
| N Test |  | 56 | 61 |
| N total | 102 | 112 | 152 |

The present invention may also relate to a method for the determination of occurrence and stage of liver disease in a subject, which comprises the steps of the method for performing classification of liver disease levels as detailed above.

As liver fibrosis is a common consequence of most chronic liver diseases, the present invention may also relate to a method of diagnosis and detection of significant or advanced liver fibrosis due to other fibrotic liver diseases such as: viral hepatitis (HBV, HCV, . . . ), Alcoholic steatohepatitis, Biliary diseases (Primary biliary cholangitis, Primary Sclerosing cholangitis, Autoimmune hepatitis, Wilson's disease, Alpha1 anti-trypsine deficiency). Said method of diagnosis and detection comprises the steps of the method for performing classification of fibrosis levels as detailed above.

The invention may further relates to a method for the prognostic of the risk of NAFLD or NASH activity evolution in the absence of a treatment in a subject, with said method for the prognostic comprises the steps of the method for performing classification of fibrosis levels as detailed above.

In the same manner, the invention may also relates to a method for the prognostic of the risk of fibrosis evolution to cirrhosis and liver clinical outcomes in the absence of treatment in a subject, with said method for the prognostic comprises the steps of the method for performing classification of liver disease severity level as detailed above.

The invention may further relate to a method for monitoring the evolution (i.e. progression or regression) of NAFLD, NASH activity and HCC in a subject, which comprises the steps of the method for performing classification of liver disease severity level as detailed above.

The invention may further relate to a method for monitoring the evolution (i.e. progression or regression) of liver disease in a subject, which comprises the steps of the method for performing classification of liver disease severity level as detailed above.

Actually, the aforementioned further aspects of the invention, and in particular the ones relative to any kind of evolution, are foreseen because the method according to the first aspect of the invention allows comparing not only scans of the same visit, but also scans from different visits to the hospital by the patient. It is thus possible to perform again the method according to the first aspect of the invention, and to compare the newly obtained results with the old ones to retrieve information about the evolution(s) of interest.

The embodiments and aspects of the here detailed invention(s) may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity.

Some processes may be presented and described in a series (sequence) of steps. It should be understood that the sequence of steps is exemplary, and that the steps may be performed in a different order than presented, some steps which are described may be omitted, and some additional steps may be omitted from the sequence and may be described elsewhere.

Reference may be made to disclosures of prior patents, publications and applications. Some text and drawings from those sources may be presented herein, but may be modified, edited or commented to blend more smoothly with the disclosure of the present application. Citation or identification of any reference should not be construed as an admission that such reference is available as prior art to the disclosure.

The methods described herein may be implemented on any form of computer or computers. The components thereof may be implemented as dedicated applications or in client-server architectures, including a web-based architecture, and can include functional programs, codes, and code segments. Any of the computers may comprise a processor, a memory for storing program data and executing it, a permanent storage such as a disk drive, a communication port for handling communications with external devices, and user interface devices, including a display, keyboard, mouse, etc. When some software or algorithms are involved, they may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

For the purposes of promoting an understanding of the principles of various embodiments of the invention, reference has been made to the first and second embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like.

To automate liver disease risk prediction, it is hereby provided an integrated, automated data management and analysis pipeline for the assessment of liver disease risk by performing, as an example for fibrosis, a classification across F0 to F2 fibrosis scores on one side, and F3 to F4 scores on the other side. A robust normalization method has been developed to compensate for low to important intra and inter-cohort technical variations. To compensate for motion artefacts, the pipeline comprises a step of registration that allows comparing radiographic images of the same visit as well as radiographic images from different visits to the hospital by the patient. Thus the method(s) according the invention can be applied to both prospective and retrospectively acquired imaging data. Furthermore, notably in comparison to LiverMultiScan®, the here proposed method can be applied to each of two modalities making it easier to be integrated in the clinical practice: 1) on CT (Computed Tomography) imaging modality, and 2) on MRI (Magnetic Resonance Imaging) supported by MRE (Magnetic Resonance Elastography).

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), and claims, based on the disclosure(s) set forth herein.

What is claimed is:

1. A method for performing classification of the severity of at least one liver disease from non-invasive radiographic images acquired during a scan, the method comprising:
   providing radiographic images of slices of at least the abdomen of a patient, with at least two radiographic images being provided for each slice; and
   pre-processing said radiographic images at least by:
     for each slice, segmenting liver and spleen from at least one of said at least two radiographic images, thus achieving a spleen binary mask and a liver binary mask per slice, and
     normalizing said radiographic images with each other, thus achieving at least two normalized radiographic images per slice;
   the method further comprising:
     for each slice, at least from the liver binary mask and said at least two normalized radiographic images, extracting at least one parameter characterizing the liver;
     computing a parameter characterizing the liver, called HPI map, the number of which being any integer equal to or larger than zero; and
     from at least one spleen binary mask, extracting at least one parameter characterizing the spleen; and
   inputting said at least one parameter characterizing the liver and said at least one parameter characterizing the spleen into a trained Machine Learning (ML) model, with this latter being designed to classify the severity of the at least one liver disease between one among a group of liver disease at early stage and a group of liver disease at advanced stage in function of both of said at least one parameter characterizing the liver and said at least one parameter characterizing the spleen,
   wherein
   said at least two radiographic images comprise at least three Computed Tomography (CT) images among which a CT image of the non-contrasted phase, a CT image of the arterial phase and a CT image of the portal venous phase,
   the pre-processing step further comprises, after the segmenting substep of said pre-processing step: for at least two of the non-contrasted phase, the arterial phase and the portal venous phase, registering said radiographic images by using the spleen binary masks and the liver binary masks, thus achieving aligned radiographic images across said at least two phases,
   the pre-processing step consisting in extracting at least one parameter characterizing the liver comprises, for each slice, extracting a map of hepatic perfusion index (HPI) from said at least two CT images, the liver binary mask and the aligned radiographic images corresponding to at least two of said at least two CT images, thus achieving a map of HPI per slice as said at least one parameter characterizing the liver, and
   the HPI is computed as the proportion of the luminance attenuation of the arterial phase to the luminance attenuation of the portal venous and arterial phases, and more particularly by solving the following equation:
   HPI=[(HUA)/(HUP+HUA)]×100, where HU is the luminance attenuation, A is the arterial phase, P is the portal venous phase.

2. The method according to claim 1, further comprising inputting patient clinical information into said trained ML model, with this latter being designed to classify the severity of the at least one liver disease between one among a group of liver disease at early stage and a group of liver disease at advanced stage not only in function of both of said at least one parameter characterizing the liver and said at least one parameter characterizing the spleen, but also in function of the patient clinical information.

3. The method according to claim 1, wherein said trained ML model is designed to classify the severity of the at least one liver disease by implementing class prediction method.

4. The method according to claim 1, wherein the ML model is based on one among regression analysis software, Support-Vector Machine (SVM) and Random Forest (RF) classifier.

5. The method according to claim 1, wherein said at least two radiographic images further comprise a CT image of a delayed phase.

6. The method according to claim 1, wherein the registering substep of said pre-processing step comprises alignment of spleen masks and of liver masks across said at least two phases.

7. The method according to claim 1, wherein said at least one parameter characterizing the spleen comprises at least one among spleen volume, spleen elongation ratio, spleen minimal size and spleen maximum size.

8. The method according to claim 1, wherein the at least one liver disease is comprised of fibrosis and said trained ML model is designed to classify fibrosis severity level between one among an early stage fibrosis group and an advanced stage fibrosis group.

9. The method according to claim 1, wherein said radiographic images are provided as DICOM (Digital Imaging and Communications in Medicine) image files.

10. The method according to claim 1, further comprising, before the pre-processing step:

controlling quality of said radiographic images, thus retaining radiographic images having a quality value superior to a determined threshold.

11. The method according to claim 1, wherein the normalizing substep of said pre-processing step comprises an automatic pixel luminance range adaptation of said radiographic images with each other.

12. The method according to claim 1, wherein the segmenting substep of said pre-processing step comprises an automatic contouring of spleen and liver for each slice.

13. The method according to claim 12, wherein the segmenting substep of said pre-processing step consists in implementing a Region Of Interest (ROI) segmentation algorithm.

14. The method according to claim 1, further comprising, after classifying the fibrosis level:
outputting, by displaying it, the fibrosis level as classified.

15. A computer program product comprising instructions which, when implemented by at least one digital processing device, performs at least the steps of the method according to claim 1.

16. A method for performing classification of the severity of at least one liver disease from non-invasive radiographic images acquired during a scan, the method comprising:
providing radiographic images of slices of at least the abdomen of a patient, with at least two radiographic images being provided for each slice; and
pre-processing said radiographic images at least by:
for each slice, segmenting liver and spleen from at least one of said at least two radiographic images, thus achieving a spleen binary mask and a liver binary mask per slice, and
normalizing said radiographic images with each other, thus achieving at least two normalized radiographic images per slice;
the method further comprising:
for each slice, at least from the liver binary mask and said at least two normalized radiographic images, extracting at least one parameter characterizing the liver;
from at least one spleen binary mask, extracting at least one parameter characterizing the spleen; and
inputting said at least one parameter characterizing the liver and said at least one parameter characterizing the spleen into a trained Machine Learning (ML) model, with this latter being designed to classify the severity of the at least one liver disease between one among a group of liver disease at early stage and a group of liver disease at advanced stage in function of both of said at least one parameter characterizing the liver and said at least one parameter characterizing the spleen,
wherein
said at least two radiographic images comprise at least:
a radiographic image, called MRI image, acquired by magnetic resonance imaging (MRI), and
a radiographic image, called MRE image, acquired by magnetic resonance elastography (MRE), and
the at least one liver disease is comprised of Non Alcoholic Steatohepatitis (NASH) and said trained ML model is designed to classify NASH severity level between one among an early stage NASH group and an advanced stage NASH group.

17. The method according to claim 16, wherein
the segmenting substep of said pre-processing step is implemented, for each slice, by using the MRI image as said at least one of said at least two radiographic images, and
the step consisting in extracting at least one parameter characterizing the liver comprises, for each slice, extracting elastography information from the MRE image by using the liver binary mask.

18. The method according to claim 16, wherein said at least one parameter characterizing the spleen comprises at least one among spleen area, spleen shape, spleen form factor, spleen compactness, spleen eccentricity and spleen solidity.

19. The method according to claim 16, wherein the at least one liver disease is comprised of Non Alcoholic Steatohepatitis (NASH) and said trained ML model is designed to classify NASH severity level between one among an early stage NASH group and an advanced stage NASH group.

20. A computer program product comprising instructions which, when implemented by at least one digital processing device, performs at least the steps of the method according to claim 16.

* * * * *